July 13, 1937.  F. A. MABREY  2,087,061
SHORTENING MEASURING DEVICE
Filed May 9, 1935  2 Sheets-Sheet 1

Inventor
Frances A. Mabrey

By Clarence A. O'Brien
Attorney

July 13, 1937.  F. A. MABREY  2,087,061
SHORTENING MEASURING DEVICE
Filed May 9, 1935        2 Sheets-Sheet 2
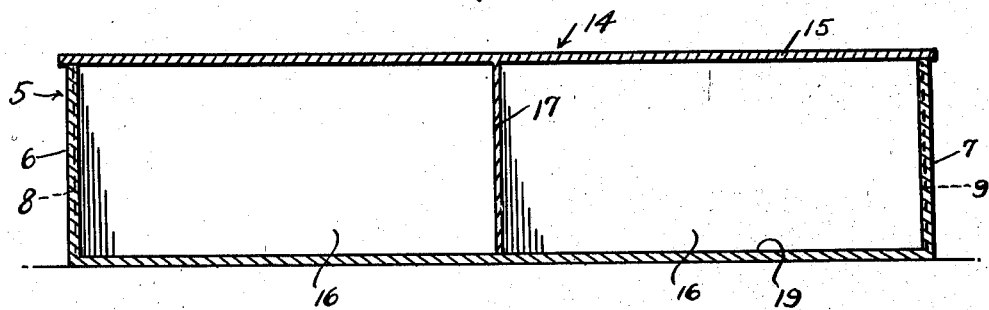
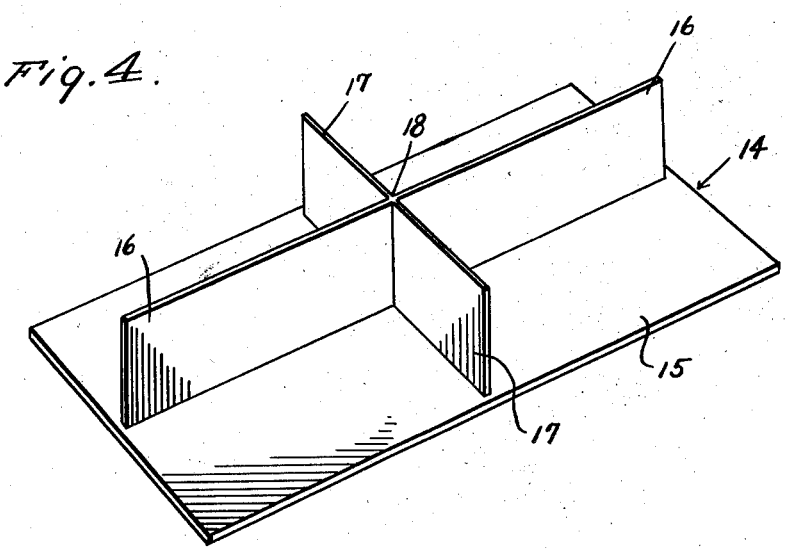
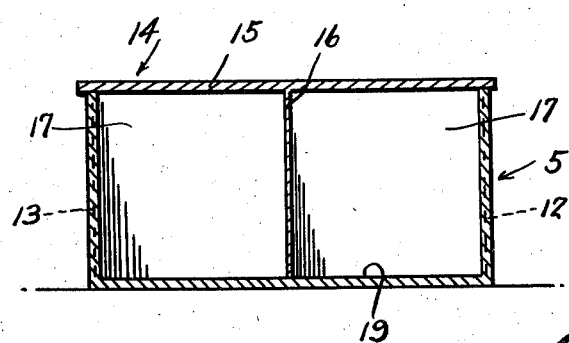
Inventor
Frances A. Mabrey
By *Clarence A. O'Brien*
Attorney Patented July 13, 1937

2,087,061

UNITED STATES PATENT OFFICE 2,087,061

SHORTENING MEASURING DEVICE

Frances Adele Mabrey, Los Angeles, Calif.

Application May 9, 1935, Serial No. 20,682

1 Claim. (Cl. 31—42)

My invention relates generally to means for moulding and measuring food products in plastic condition, and particularly to a device for moulding measured proportions of shortening and the like, and an important object of my invention is to provide a simple and relatively inexpensive device of the character indicated which greatly facilitates the operations of providing wanted measured quantities of shortening and the like in convenient form.

Another important object of my invention is to provide a device of the character indicated above which is sanitary and rugged, and which eliminates the waste of shortening which is characteristic of the use of cups and other containers presently being used for measuring and dispensing shortening and the like, one phase of such waste being exhibited in the tendency of the shortening to stick in the cup or the like and upon the spoon or other instrument which must be utilized to remove the shortening therefrom.

Other important objects of my invention will be apparent from a reading of the following description in connection with the drawings, wherein for purposes of illustration I have shown a preferred embodiment of my invention.

In the drawings:—

Figure 3 is a longitudinal vertical sectional view taken through Figure 1 approximately on the line 3—3 and looking upwardly in the direction of the arrows.

Figure 4 is a perspective view of the top or cover of the embodiment showing the lower side thereof.

Figure 5 is a transverse vertical sectional view taken through Figure 1 approximately on the line 5—5 and looking toward the left in the direction of the arrows.

Figure 1:
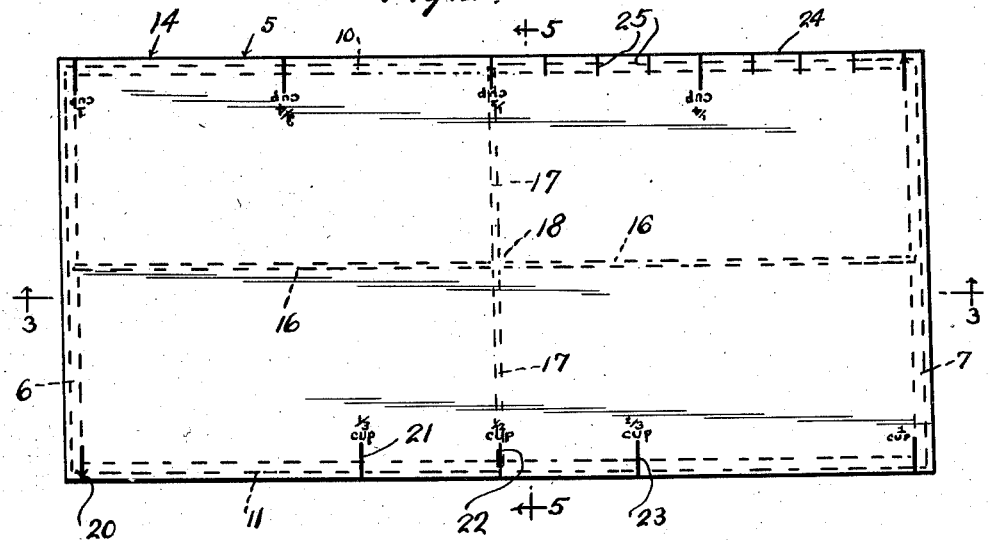
Figure 1 is a top plan view of the embodiment.
Figure 2:
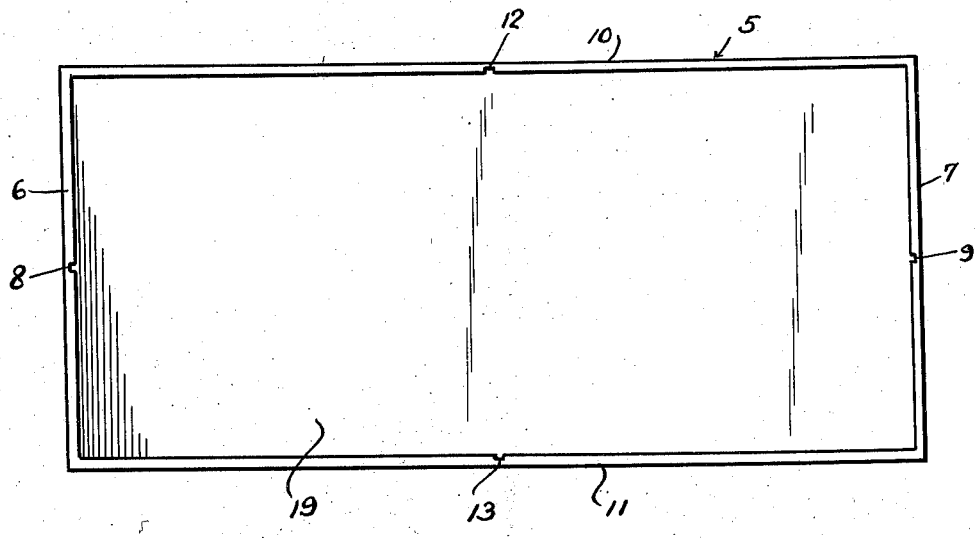
Figure 2 is a top plan view of the embodiment with the cover or top thereof removed.

Referring in detail to the drawings, the numeral 5 refers generally to an elongated rectangular box form which is open at its top to receive the shortening or the like which is placed therein and packed with a spatula or some other suitable instrument and smoothed off level with the upper edges of the side and end walls.

The end walls 6 and 7 have respective centered vertical grooves 8 and 9, while the side walls 10 and 11 have respective centered vertical grooves 12 and 13.

The top or cover of the device is generally designated 14 and comprises the rectangular flat plate 15 which is enough larger in width and length than the top of the box 5 so that marginal edge portions of the cover extend beyond the ends and side walls of the box when the cover is in place.

The underside of the plate 15 has depending therefrom the centered longitudinal blade 16 and the centered transverse blade 17, these blades being joined and intersecting at the point indicated by the numeral 18. Each of the blades is rectangular in form and of such a height as to approximately or actually strike the bottom 19 of the box 5 when the cover is in place, as indicated in Figure 3. The respective knives are of such a length as to have their end edges slide well into the respective vertical grooves 8, 9 and 12, 13 which are on the inner surface of the respective walls of the box as already indicated.

With the box 5 filled as indicated with shortening, the cover is pushed down with the ends of the blades in the corresponding grooves in the walls of the box and the downward pushing continued until the lower edges of the knives strike the bottom 19 of the box, whereby the contents of the box is cut into four equal rectangular cross section blocks.

The usual practice is to refrigerate the shortening and this can be very nicely accomplished by putting the box in the condition resulting from the above described operations in the ice-box or refrigerator until the desired degree of refrigeration of the contents of the box has been achieved. The box may then be removed and hot water poured thereon and then inverted so that the box may lie on a supporting surface with the upper side of the cover 14 resting on such surface. The box is then simply raised from its place on the cover 14 so as to leave the rectangular cross section refrigerated blocks of shortening on the cover 14. A knife or spatula or other suitable instrument may then be conveniently employed for separating the blocks of shortening from the knives, if necessary.

The upper side of the cover 14 is provided on opposite longitudinal edges with a zero measuring point which is indicated by the arrow 20 and longitudinally spaced therefrom are graduations 21, 22, and 23 which indicate proportional parts of the shortening blocks corresponding to one-third of a cup or one-fourth of a cup or one-half of a cup or three-quarters of a cup or multiples thereof. The edge 24 of the cover has sub-divisions 25 which enable cutting the blocks into exact tablespoonfuls or similar smaller measures simply by laying the edge of the top along the block and cutting at the proper indicia, transversely of the block.

Inasmuch as it is not desired to limit the graduations on either edge of the cover to any specific measurements, the foregoing statement of specific measurements being made for illustrative purposes only, no exact and limiting designation of the divisions of the lengths of the opposite edges of the cover is made. Similarly the size both as to length and width of the box 5 is unlimited as far as the present invention is concerned. I have found the device very useful for forming four blocks of a length, width and cross section which define a bulk of shortening corresponding to two cupfuls.

The box and the top including the knives will preferably be formed of cast aluminum and the shortening contacting areas thereof highly polished so that the shortening will not stick unduly thereto. Aluminum also affords adequate rigidity and strength, with lightness in weight.

Each of the four blocks of shortening produced is preferably 1½ x 1½ x 3¼ inches in measurement so as to have a cubical content corresponding to that of a half-cup of shortening or the like. Thus, two of the blocks placed side by side make up a block one cup in size. As stated herein, smaller sub-divisions may be exactly obtained with the guidance afforded by the graduations on the top of the cover of the apparatus.

Although I have shown and described herein a preferred embodiment of my invention, it is to be definitely understood that I do not desire to limit the application of the invention thereto, and any change or changes may be made in the materials and in the structure and arrangment of the parts, within the spirit of the invention and the scope of the subjoined claim.

What is claimed is:—

A household shortening measuring and blocking device comprising a rectangular box having an open top, a rectangular cover for said box designed to rest upon the upper edges of the box, and longitudinal and transverse intersecting partitions depending from the underside of said cover, the lower edges of said partitions being arranged to engage the bottom of said container when the cover is in closed position and resting on the upper edges of said box, the side and end walls of said container being formed with vertical grooves conformably and slidably accommodating the vertical edges of the partitions, said partitions being arranged to cut the plastic contents of said box into isolated blocks of predetermined cross section as the cover is forced into closed position.

FRANCES ADELE MABREY.